(12) United States Patent
Natori

(10) Patent No.: US 6,643,647 B2
(45) Date of Patent: Nov. 4, 2003

(54) WORD STRING COLLATING APPARATUS, WORD STRING COLLATING METHOD AND ADDRESS RECOGNITION APPARATUS

(75) Inventor: Naotake Natori, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 335 days.

(21) Appl. No.: 09/824,876

(22) Filed: Apr. 4, 2001

(65) Prior Publication Data

US 2001/0031088 A1 Oct. 18, 2001

(30) Foreign Application Priority Data

Apr. 4, 2000 (JP) ........................................ 2000-102370

(51) Int. Cl.[7] .............................................. G06F 17/30
(52) U.S. Cl. ................................ 707/6; 707/7; 707/202; 704/254; 715/536
(58) Field of Search ........................... 707/4, 6, 7, 100, 707/101, 200, 202; 704/235, 254; 341/90; 382/229; 712/17; 715/532, 536

(56) References Cited

U.S. PATENT DOCUMENTS

| | | | | |
|---|---|---|---|---|
| 5,377,349 A | * | 12/1994 | Motomura ...................... | 707/7 |
| 5,497,488 A | * | 3/1996 | Akizawa et al. ............... | 707/6 |
| 5,535,119 A | * | 7/1996 | Ito et al. ......................... | 704/3 |
| 5,873,111 A | * | 2/1999 | Edberg ........................ | 715/536 |
| 5,991,755 A | * | 11/1999 | Noguchi et al. ............... | 707/3 |
| 5,995,963 A | * | 11/1999 | Nanba et al. .................. | 707/6 |
| 6,169,999 B1 | * | 1/2001 | Kanno ......................... | 715/532 |
| 6,173,251 B1 | * | 1/2001 | Ito et al. ......................... | 704/7 |
| 6,338,061 B1 | * | 1/2002 | Shimomura .................... | 707/6 |
| 6,493,713 B1 | * | 12/2002 | Kanno ............................ | 707/6 |
| 6,507,678 B2 | * | 1/2003 | Yahagi ........................ | 382/305 |

OTHER PUBLICATIONS

Self–Organization and Associative Memory, Chap. 2, Sec. 2, "Distance Measures for Patterns", Springer–Verlag Berlin Heidelberg; T. Kohonen; 1984, pp. 59–66.

A Method for the Correction of Garbled Words Based on the Levenshtein Metric, IEEE Transactions on Computers, vol. C–25, No. 2; T. Okuda, et al.; Feb. 1976.

* cited by examiner

Primary Examiner—Shahid Al Alam
(74) Attorney, Agent, or Firm—Pillsbury Winthrop LLP

(57) ABSTRACT

In a word string collating method for collating an input word string and address data in an address dictionary when a word string using part of a plurality of words of a word string such as address information is extracted from the result of character recognition for the word string including the plurality of words, words of the input word string and words used as the address data in the address dictionary are set to correspond to each other, distances between the words are derived based on similarities between the words which are set into the correspondence relations, the positional relation of each word of the input word string which is set into the correspondence relation is derived, an evaluated value is derived based on the thus derived positional relation and the distance between the words which are set in the correspondence relation, and a partial word string extracted from the input word string is determined based on the evaluated value.

14 Claims, 7 Drawing Sheets

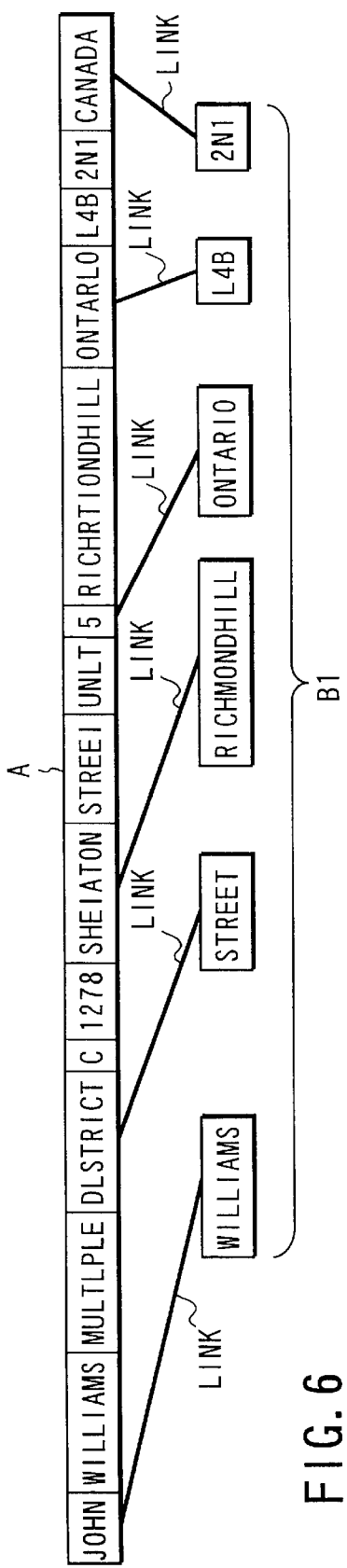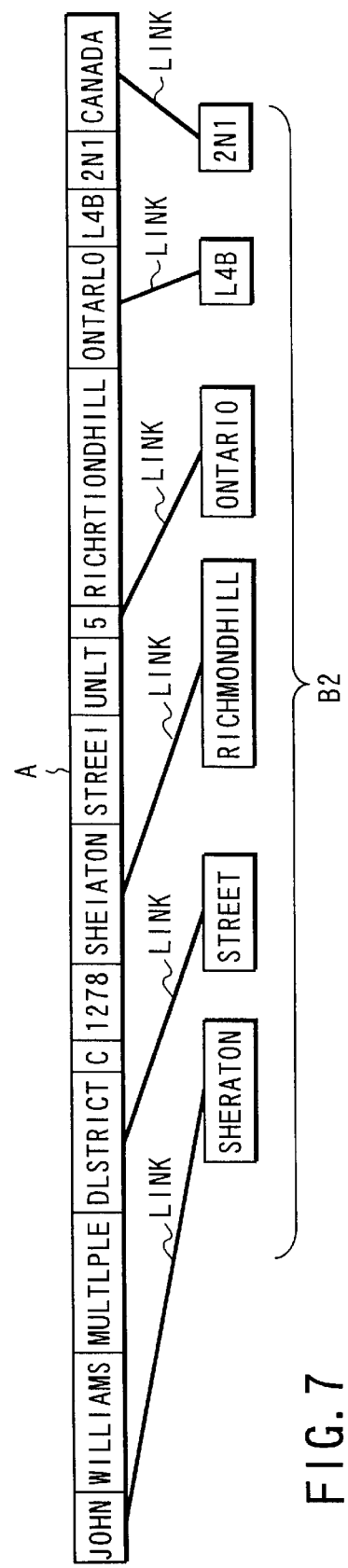
FIG. 6
FIG. 7

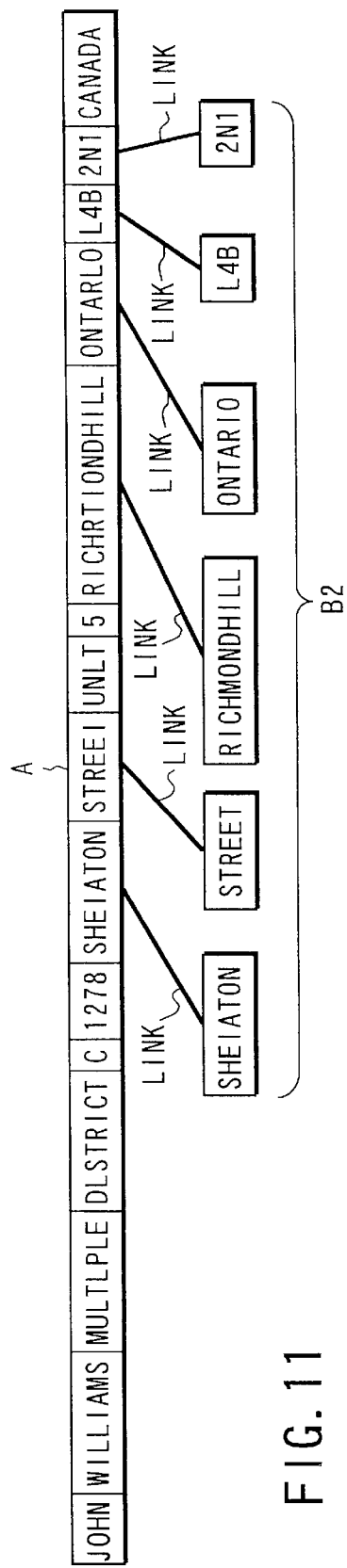
FIG. 11
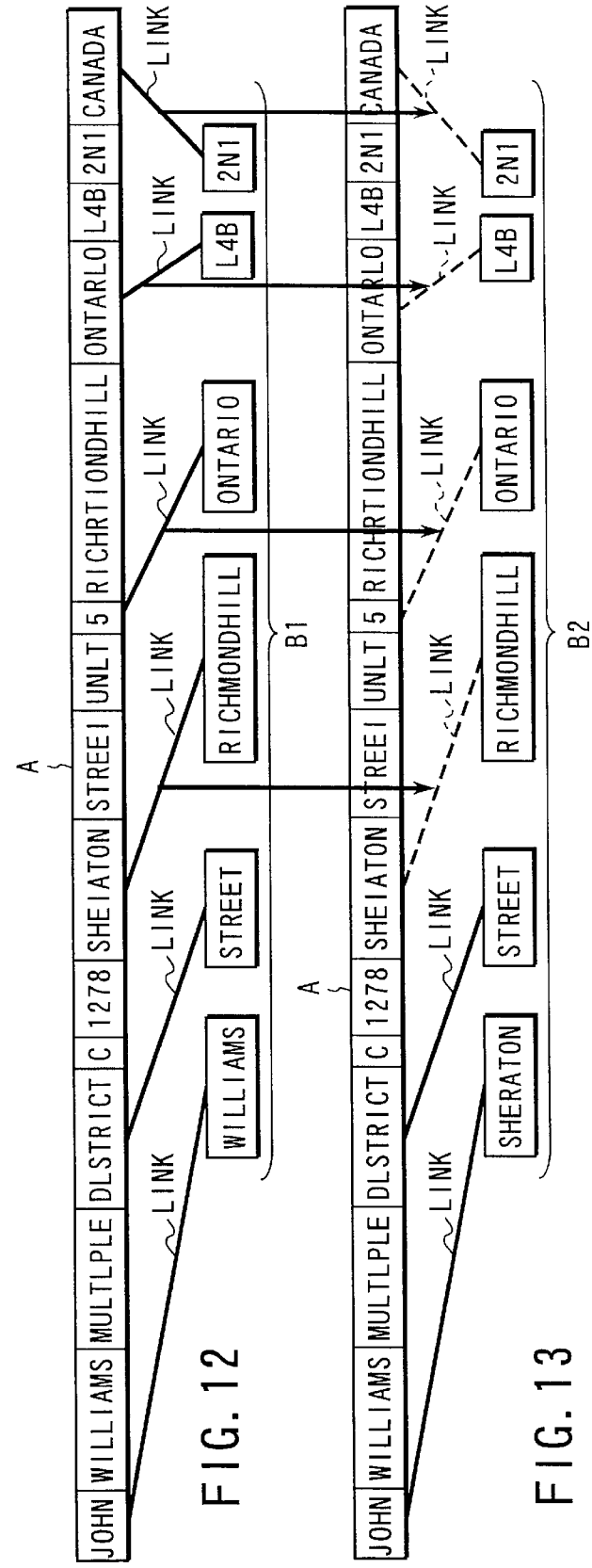
FIG. 12
FIG. 13

WORD STRING COLLATING APPARATUS, WORD STRING COLLATING METHOD AND ADDRESS RECOGNITION APPARATUS

CROSS-REFERENCE TO RELATED APPLICATIONS

This application is based upon and claims the benefit of priority from the prior Japanese Patent Application No. 2000-102370, filed Apr. 4, 2000, the entire contents of which are incorporated herein by reference.

BACKGROUND OF THE INVENTION

This invention relates to a word string collating apparatus and word string collating method for collating a word string such as an address with addresses in an address dictionary when the word string is extracted from a character recognition result which may contain an error in the character recognition field in which a document inputting apparatus or an optical character reading apparatus for reading address information is used, for example, and an address recognition apparatus for recognizing the address.

For example, an apparatus for extracting only a word string of an address from a word string containing a destination address name, honorific title and the like written on an envelop by collating the word string with addresses in an address dictionary is proposed.

As this type of word string collating apparatus, an address collating apparatus for collating words based on a distance between words, for example, an apparatus for effecting a word collating process based on an edition distance (Levenshtein distance, LD, V. Levenstein; Sov. Phys. Dokl. 10, 707) or the like is known in the art. The outline thereof is to derive distances (similarities) between an input word string and words in the address dictionary and effect the address collating process by using the derived distances as the measurement when a word string is extracted from a set of input character recognition results containing errors.

The prior art technique is explained in detail below.

FIG. 1 shows the construction of an address collating apparatus used as the conventional word string collating apparatus. In FIG. 1, an input section 1 converts a document image into a form which can be processed by a computer when receiving the document image (for example, it is a photoelectric conversion device such as an image scanner).

A character recognition section 2 performs processes such as the binary coding process, segmentation process and individual character recognition process for understanding the contents of the document image based on the input document image. In this case, a recognition result obtained in the character recognition section 2 is hereinafter referred to as a character recognition result. The character recognition technique has been studied for a long period of time, but a system capable of attaining the character recognition rate of 100% without fail cannot be realized except some restricted cases. Therefore, it is required in practice to provide means for correctly extracting a word string even if the character recognition result contains an error.

A word string forming section 3 forms a word string A based on the character recognition result in the character recognition section 2 and stores the same into a memory M1. The word string A is a set of character strings segmented in the unit of word.

For example, the word string A constructed by 15 words of "JOHN", "WILLIAMS", "MULTIPLE", "DLSTRICT", "C", "1278", "SHEIATON", "STREEI", "UNLT", "5", "RICHRTIONDHILL", "ONTARLO", "L4B", "2N1" and "CANADA" are formed as shown in FIGS. 3 and 4 based on the address of FIG. 2.

In an address dictionary M2 used as the word dictionary, a plurality of address data items (words) B1, B2, . . . are previously stored and desired data items can be read out at any time.

For example, as shown in FIG. 3, the address data B1 including six word items of the street name "WILLIAMS", street suffix "STREET", city name "RICHMONDHILL", state name "ONTARIO", zip code (upper three digits) "L4B" and zip code (lower three digits) "2N1" is read out.

Further, as shown in FIG. 4, the address data B2 including six word items of the street name "SHERATON", street suffix "STREET", city name "RICHMONDHILL", state name "ONTARIO", zip code (upper three digits) "L4B" and zip code (lower three digits) "2N1" is read out.

A distance calculating section 11 calculates a distance $C_{LD}$ between words by use of the word string A and address data B1 and stores the distance in a memory M4. The distance $C_{LD}$ between the words can be variously defined and an edition distance (which is also called a Levenshtein distance and is hereinafter simply referred to as LD) is given as one example thereof. LD indicates the minimum value of the number of operations of replacement, insertion and deletion of characters required for converting the word string A into the other word string B1. The operation is expressed by the following equation.

$$L_D(A,B1) = min\{pa(i) + qb(i) + rc(i)\}$$

where a(i) indicates a certain number of replacing operations, b(i) indicates a certain number of insertion operations, and c(i) indicates a certain number of deletion operations. Further, p, q, r are weighting factors used for the edition operation of replacement, insertion and deletion and depend on appearing characters. Generally, since the number of combinations of a(i), b(i), c(i) is limitless, the minimum value of LD(A, B1) is derived by use of the dynamic programming method ($D_p$).

An optimum solution deriving section 12 selects one of a plurality of address data items B1, B2, . . . which has the minimum distance $C_{LD}$ with respect to the word string A and provides the selected address data as the optimum solution.

An output section 10 converts the thus acquired optimum solution into a form which the user can understand and outputs the thus converted address data and is a display device, for example.

Conventionally, since only the distance (similarity) $C_{LD}$ between the words is used to perform the address collating process, there occurs a possibility that erroneous address data is selected as the optimum solution rather than correct address data. The operation is explained with reference to FIGS. 2, 3, 4.

FIGS. 3 and 4 show address collating methods based on the conventional method by taking an address (imaginary) in Canada as an example. An input document image is shown in FIG. 2. In this example, "John Williams/Multiple District C/1278 Sheraton Street Unit 5/Richmondhill ONTARLO L4B 2N1 CANADA" is written. The result obtained by processing the document image by use of the character recognition section 2 and word string forming section 3 is a word string containing a character error. As described before, a character error is contained in the word string.

In this case, the recognized characters are all converted into capital letters (no distinction between capital letters and small letters). As shown in FIGS. 3 and 4, the word string containing the character error is "JOHN-WILLIAMS-MULTIPLE-DISTRICT-C-1278-SHEIATON-STREEI-UNLT-5-RICHRTIONDHILL-ONTARLO-L4B-2N1-CANADA".

In the address dictionary M2, a plurality of address data items B1, B2, . . . are previously stored. In order to simplify the explanation, only two address data items including the first address data B1 "WILLIAMS-STREET-RICHIMONDHILL-ONTARIO-L4B-2N1" as shown in FIG. 3 and the second address data B2 "SHERATON-STREET-RICHIMONDHILL-ONTARIO-L4B-2N1" as shown in FIG. 4 are provided. The items in each of the address data items sequentially and respectively indicate the street name, street suffix, city name, state name, postal code (upper three digits) and postal code (lower three digits) from the head portion.

The distance calculating section 11 compares the word string A with the first address data B1 and the second address data B2. The method is to derive a word having the minimum distance (maximum similarity) for each item in the address data B1 (B2). In the case shown in FIGS. 3 and 4, the distance between the words is derived based on LD and the similarity is derived according to the following equation (1).

$$\text{SIMILARITY} = \frac{1}{LD'(A, B) + \epsilon} \quad (1)$$
$$LD'(A, B) = \frac{LD(A, B)}{len(A) + len(B)}$$

where len(A) and len(B) are functions expressing the lengths of the character strings, and LD'(A,B) indicates a normalized LD. Further, $\epsilon$ may be a desired small real number, but in this example, $\epsilon$ is set at "1". Then, when LD is set at the minimum value (that is, the word strings A and B are the same), the similarity is set at the maximum value "1".

Various words which are not present in the address data items B1, B2 may exist in the document image. For example, "Multiple District C" is not a formal address, but indicates a block. Further, it may indicate the address name, the room number, or the name of a country. Among them, the name of the receiver (address name) such as "Williams" as in this example may become the same as the street name or city name in some cases.

In the conventional method, since only the distance (similarity) is used, the street name of the first address data B1 and the name of the receiver (address name) may be erroneously collated in the example of collation for the word string A and first address data B1. In addition, since a character error between "Sheraton" and "SHEIATON" occurs in the character recognition process when the word string A and the second address data B2 are compared with each other, the result of comparison becomes worse than in the case of comparison between the word string A and the first address data when only the distance (similarity) is used, and as a result, erroneous recognition may occur.

BRIEF SUMMARY OF THE INVENTION

Accordingly, an object of this invention is to provide a word string collating apparatus and word string collating method capable of performing the highly precise word string collating process in comparison with the conventional case when an input word string and each word in the word dictionary are collated in the character recognition field.

Another object of this invention is to provide an address recognition apparatus capable of recognizing a word string of an address at high precision based on a destination address constructed by a word string including words of an address name, receiver's name, honorific title (position title), zip code and the like.

According to a first aspect of this invention, there is provided a word string collating apparatus for collating an input word string and words in a word dictionary when a partial word string is extracted from the result of character recognition for a word string including a plurality of words, comprising correspondence setting means for variously setting correspondence relations between the words of the input word string and the words in the word dictionary according to the number of words of the extracted partial word string; deriving means for deriving each distance between the words which are set into the correspondence relation by the correspondence setting means based on each similarity between the words and deriving the positional relation of each word of the input word string which is set into the correspondence relation by the correspondence setting means; and determining means for deriving an evaluated value based on the positional relation derived by the deriving means and the distance between the words which are set into the correspondence relation by the correspondence setting means for each type of the correspondence relation set by the correspondence setting means and determining a partial word string extracted from the input word string based on the evaluated value.

According to a second aspect of this invention, there is provided a word string collating apparatus for collating an input word string and words in a word dictionary when a partial word string is extracted from the result of character recognition for a word string including a plurality of words, comprising word string forming means for forming a word string based on the result of character recognition for a word string including a plurality of words; correspondence setting means for variously setting a correspondence relation between each word of the word string formed by the word string forming means and each word in the word dictionary according to the number of words of the extracted partial word string; distance calculating means for deriving a distance between words based on a similarity between the words which are set into the correspondence relation by the correspondence setting means; positional relation deriving means for deriving a positional relation of each word of the formed word string which is set into the correspondence relation by the correspondence setting means; evaluated value deriving means for deriving an evaluated value based on the positional relation derived by the positional relation deriving means and the distance, derived by the distance calculating means, between the words which are set to correspond to each other by the correspondence setting means for each type of the correspondence relation set by the correspondence setting means; and determining means for determining a partial word string extracted from the formed word string based on the evaluated value derived by the evaluated value deriving means.

According to a third aspect of this invention, there is provided a word string collating apparatus for collating words of an input first word string including a plurality of words and words of each of third various word strings of a word dictionary when a second word string using part of the plurality of words of the first word string is extracted from the result of character recognition for the first word string, comprising character recognizing means for recognizing the first word string containing the second word string to be extracted in the unit of character; word extracting means for extracting characters recognized by the character recognizing means in the unit of word; and word string extracting means for collating the first word string including a plurality of words extracted by the word extracting means and the third various word strings of the word string dictionary, determining words of the second word string in the first word string respectively corresponding to the words of the third word string based on similarities between the words of the first word string and the words of the third word string, making evaluation for each of the third word strings based on the number of words between the words in the second word string thus determined and the similarities between the words of the third word string and the words of the second word string determined, and extracting one of the third word strings as the second word string.

According to a fourth aspect of this invention, there is provided an address recognition apparatus for recognizing an address written on a paper sheet, comprising character recognizing means for recognizing a word string containing an address word string written on the paper sheet in the unit of character; word extracting means for extracting characters recognized by the character recognizing means in the unit of word; an address word string dictionary for previously storing a plurality of first word strings each constructing an address in which a word arrangement order is determined; and address word string recognizing means for collating a second word string including a plurality of words extracted by the word extracting means and the first various word strings in the address word string dictionary, determining words of the second word string respectively corresponding to the words of the first word string based on similarities between the words of the first word string and the words of the second word string, making evaluation for each of the first word strings based on the number of words between the words in the second word string thus determined and the similarities between the words of the first word string and the words of the second word string determined, and recognizing one of the first word strings as the address word string.

According to a fifth aspect of this invention, there is provided an address recognition apparatus for recognizing an address written on a paper sheet, comprising character recognizing means for recognizing a word string containing an address word string written on the paper sheet in the unit of character; word extracting means for extracting characters recognized by the character recognizing means in the unit of word; an address word string dictionary for previously storing a plurality of first word strings each constructing an address in which a word arrangement order is determined; and address word string recognizing means for collating a second word string including a plurality of words extracted by the word extracting means and the first various word strings in the address word string dictionary, determining words of the second word string respectively corresponding to the words of the first word string based on the word arrangement order and similarities between the words of the first word string and the words of the second word string, making evaluation for each of the first word strings based on the number of words between the respective words in the second word string thus determined and the similarities between the words of the first word string and the words of the second word string determined, and recognizing one of the first word strings as the address word string.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6 and 7 are diagrams for illustrating an example of links attained by use of a link initializing section in the first embodiment;

FIG. 11 is a diagram for illustrating a process effected by a link initializing section used in a second embodiment of this invention; and FIGS. 12 and 13 are diagrams for illustrating a process effected by a link initializing section used in a third embodiment of this invention.

DETAILED DESCRIPTION OF THE INVENTION

There will now be described embodiments of this invention with reference to the accompanying drawings.

The first embodiment of this invention is explained.

Figure 5:
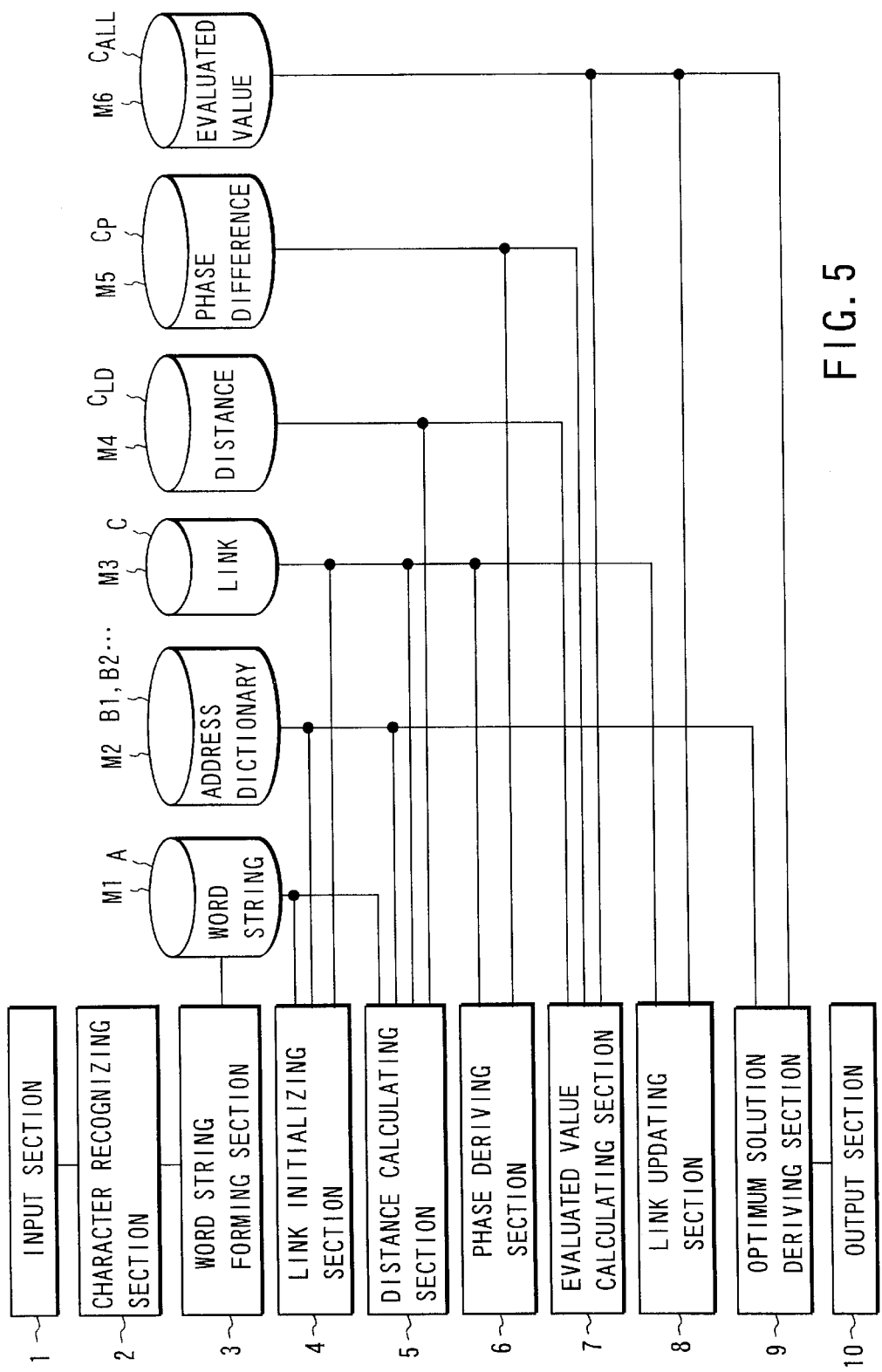
FIG. 5 is a block diagram schematically showing the construction of a word string collating apparatus according to a first embodiment of this invention.

FIG. 5 schematically shows the construction of a word string collating apparatus according to the first embodiment of this invention. The word string collating apparatus includes an input section 1 used as input means, a character recognizing section 2 used as recognition means, a word string forming section 3 used as word string forming means, a link initializing section 4 used as correspondence setting means, a distance calculating section 5 used as distance calculating means, a phase deriving section 6 used as positional relation deriving means, an evaluated value calculating section 7 used as evaluated value calculating means, a link updating section 8 used as updating means, an optimum solution deriving section 9 used as optimum solution deriving means, an output section 10, a memory M1 for storing a word string A, an address dictionary M2 used as a word dictionary for storing a plurality of address data items (words) B, a memory M3 for storing a link C, a memory M4 for storing a distance $C_{LD}$, and a memory M5 for storing an evaluated value $C_{ALL}$.

The above sections are explained in detail below.

Figure 1:
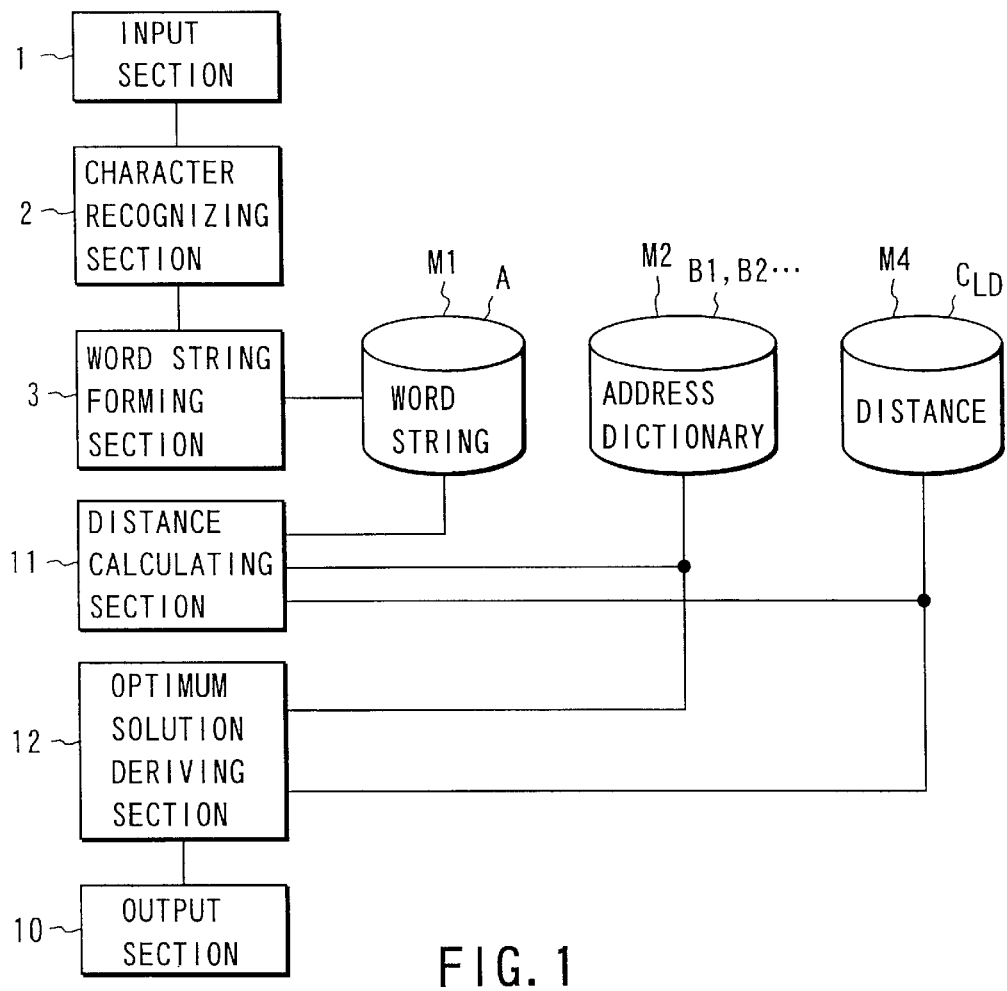
FIG. 1 is a block diagram schematically showing the construction of the conventional word string collating apparatus.
Figure 2:
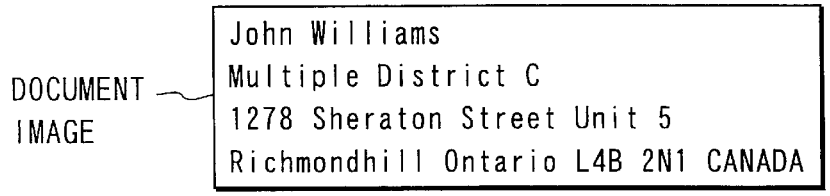
FIG. 2 is a view showing an example of a document image to be read.
Figure 3:
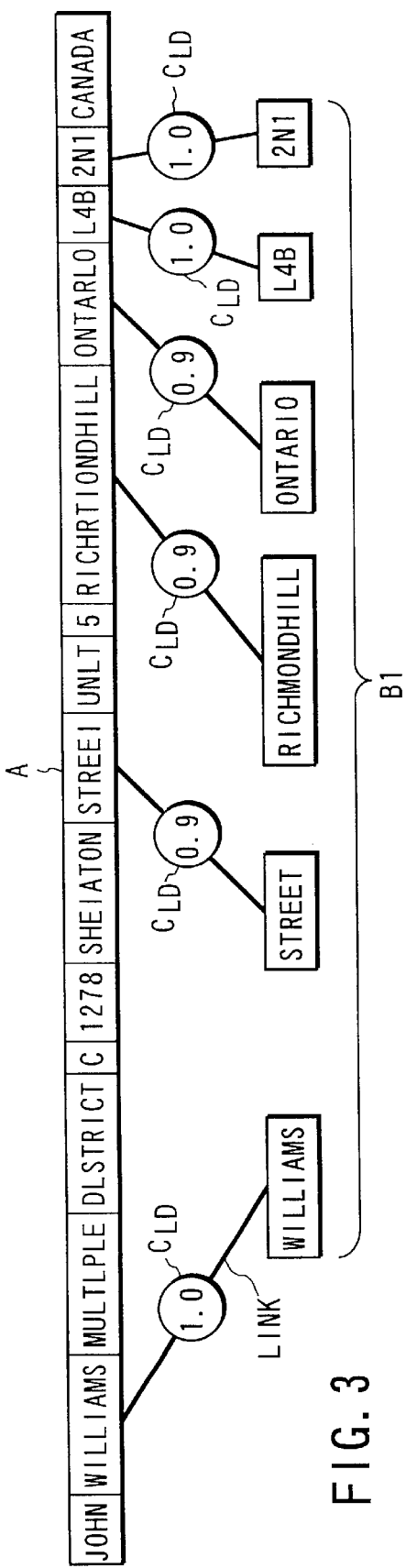
FIGS. 3 and 4 are schematic diagrams for illustrating a conventional address collating method.
Figure 4:
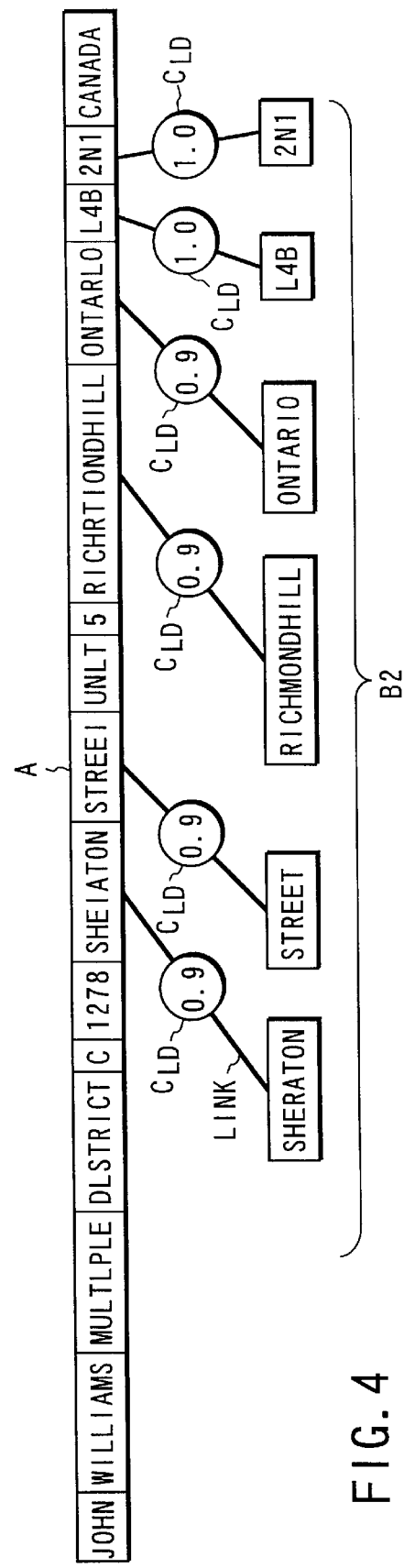

As shown in FIG. 2, when a document image of an address written on an envelop or the like is input, the input section 1 converts the document image into a form which a computer can process.

It is constructed by a reading device, for example, a photoelectric converting device such as an image scanner.

The character recognizing section 2 performs processes such as a binary coding process, segmentation process, individual character recognition process and the like for understanding the contents of the document image based on the document image input by use of the input section 1. In this specification, the recognition result obtained in the character recognizing section 2 is referred to as a character recognition result.

The word string forming section 3 forms a word string A based on the character recognition result of the character recognizing section 2 and stores the thus formed word string into the memory M1. The word string A is a set of character strings segmented in the unit of word. For example, the word strings are segmented based on the length of a space between characters or the type of the character.

For example, a word string A constructed by 15 words of "JOHN", "WILLIAMS", "MULTIPLE", "DLSTRICT", "C", "1278", "SHEIATON", "STREEI", "UNLT", "5", "RICHRTIONDHILL", "ONTARLO", "L4B", "2N1", "CANADA" are formed as shown in FIGS. 6 and 7 based on the address of FIG. 2.

In the address dictionary M2 used as the word dictionary, a plurality of address data items (words) B1, B2, . . . are previously stored and desired data items can be read out at any time.

For example, as shown in FIG. 6, the address data B1 including six word items of the street name "WILLIAMS", street suffix "STREET", city name "RICHMONDHILL", state name "ONTARIO", zip code (upper three digits) "L4B" and zip code (lower three digits) "2N1" is read out.

Further, as shown in FIG. 7, the address data B2 including six word items of the street name "SHERATON", street suffix "STREET", city name "RICHMONDHILL", state name "ONTARIO", zip code (upper three digits) "L4B" and zip code (lower three digits) "2N1" is read out.

The link initializing section 4 initializes a link C according to one address data item B1, (B2, . . . ) read out from the address memory M2. In this case, each time the address data item B1, B2, . . . read out, all of the links are re-set and the state is shown in FIGS. 6, and 7. The link C indicates the correspondence relation between the words of the word string A and the words of the address data item B1, B2, . . . and the correspondence relation is changed (updated) at any time by the link updating section 8 which will be described later.

One example of the link initialization is explained below. In this example, the number of links is set equal to the number of items of the address data items B1, . . . . That is, the address data items B1, . . . each include six items corresponding to the street name, street suffix, city name, state name, zip code (upper three digits), and zip code (lower three digits). The link is expressed by two arrays. That is, the link is expressed by the following equation (2).

$$x_M[i] = i \quad (2)$$

$$x_I[i] = \frac{i*(n-1)}{5}$$

where i is an index number of the link which satisfies the following condition.

$$0 \leq i \leq 5 \quad (3)$$

Further, n indicates the number of words of the word string A, $x_M[i]$ indicates the number of the item (which lies in the range of the street name (0) to the postal code (5)) on the address data B1, . . . side, and $x_1[i]$ indicates the number of the word (which lies in the range of the head (0) to the tail (n−1)) on the word string A side.

Thus, the link initialization results are shown in FIG. 6 and FIG. 7. FIG. 6 show the initialized link between the word string A and the address data B1 and FIG. 7 show the initialized link between the word string A and the address data B2. Thus, the links are uniformly arranged.

That is, as shown in FIG. 6, "JOHN" of the word string A and "WILLIAMS" of the address data B1 are linked, "DLSTRICT" of the word string A and "STREET" of the address data B1 are linked, "SHEIATON" of the word string A and "RICHMONDHILL" of the address data B1 are linked, "5" of the word string A and "ONTARIO" of the address data B1 are linked, "ONTARLO" of the word string A and "L4B" of the address data B1 are linked, and "CANADA" of the word string A and "2N1" of the address data B1 are linked.

Further, as shown in FIG. 7, "JOHN" of the word string A and "SHERATON" of the address data B2 are linked, "DLSTRICT" of the word string A and "STREET" of the address data B2 are linked, "SHEIATON" of the word string A and "RICHMONDHILL" of the address data B2 are linked, "5" of the word string A and "ONTARIO" of the address data B2 are linked, "ONTARLO" of the word string A and "L4B" of the address data B2 are linked, and "CANADA" of the word string A and "2N1" of the address data B2 are linked.

The distance calculating section 5 calculates the distance $C_{LD}$ between the linked words of the word string A and address data B1, (B2, . . . ) and stores the calculated distance in the memory M4. The distance between the words can be variously defined and an edition distance (which is also called a Levenshtein distance and is hereinafter simply referred to as LD) is given as one example thereof. In this embodiment, the distance between the words is calculated based on LD and the similarity between the word string A and the address data B1 (B2, . . . ) is derived according to the following equation (4).

$$\text{SIMILARITY} = \frac{1}{LD'(A, B) + \varepsilon} \quad (4)$$

$$LD'(A, B) = \frac{LD(A, B)}{len(A) + len(B)}$$

where len(•) is a function expressing the length of the character string, and LD'(•,•) indicates normalized LD. Further, $\varepsilon$ may be a desired small real number, but in this example, $\varepsilon$ is set at "1". Then, when LD is set at the minimum value (that is, the word string A and the address data B1 are the same), the similarity is set at the maximum value "1".

In the distance calculating section 5, the above calculation is made for the words related by the links and the distances thus calculated are averaged. That is, a value indicated by the following equation (5) is derived and the thus derived value is stored in the memory M4 as the distance $C_{LD}$.

$$C_{LD} = \frac{1}{6} \sum_i \frac{1}{LD'(str(x_M[i]), str(x_I[i])) + \varepsilon} \quad (5)$$

The phase deriving section 6 derives a phase difference between each link and a neighboring link according to the following equation (6). In this embodiment, in order to simplify the explanation, links before and after the corresponding link (at most two links) are used as the neighboring links.

SIMILARITY=$(D_{i,i-1}{}^M - D_{i,i-1}{}^I)^2 + (D_{i,i+1}{}^M - D_{i,i+1}{}^I)^2$ $D_{i,i-1}{}^M$=norm$(x_M[i-1]-x_M[i])$, $D_{i,i-1}{}^I$=norm $(x_I[i-1]-x_I[i])$ $D_{i,i+1}{}^M$=norm$(x_M[i+1]-x_M[i])$, $D_{i,i+1}{}^I$=norm $(x_I[i+1]-x_I[i])$ where norm(•) is a normalization function corresponding to the number of words of the address data B1 (B2, . . . and word string A (in this case, the number of words (the number of items) of the address data B1 (B2, . . . ) is fixed at six).

Figure 8:
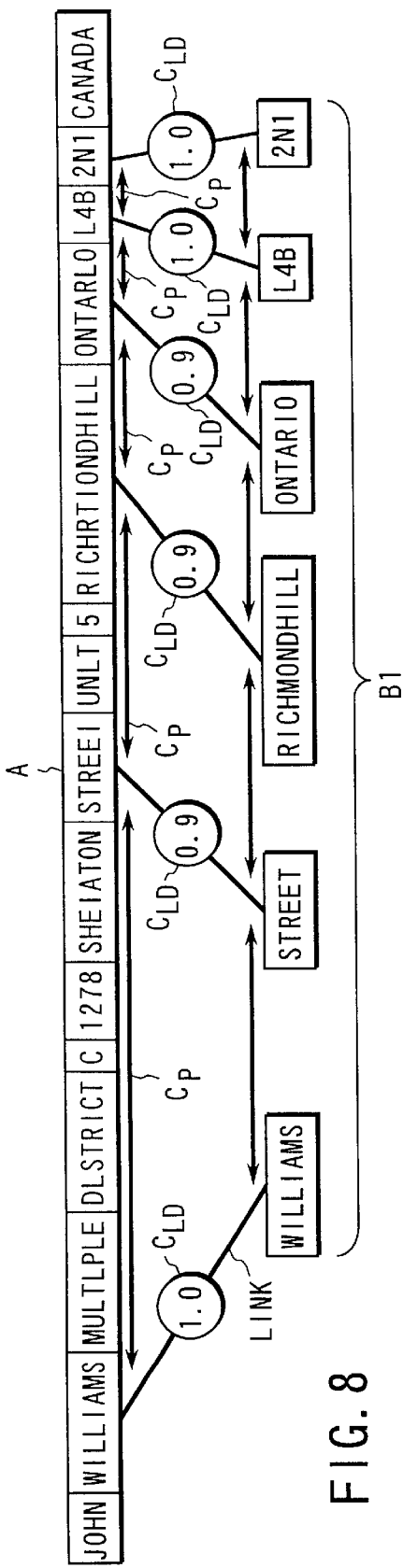
FIGS. 8 and 9 are diagrams for illustrating a process effected by the link initializing section in the first embodiment.
Figure 9:
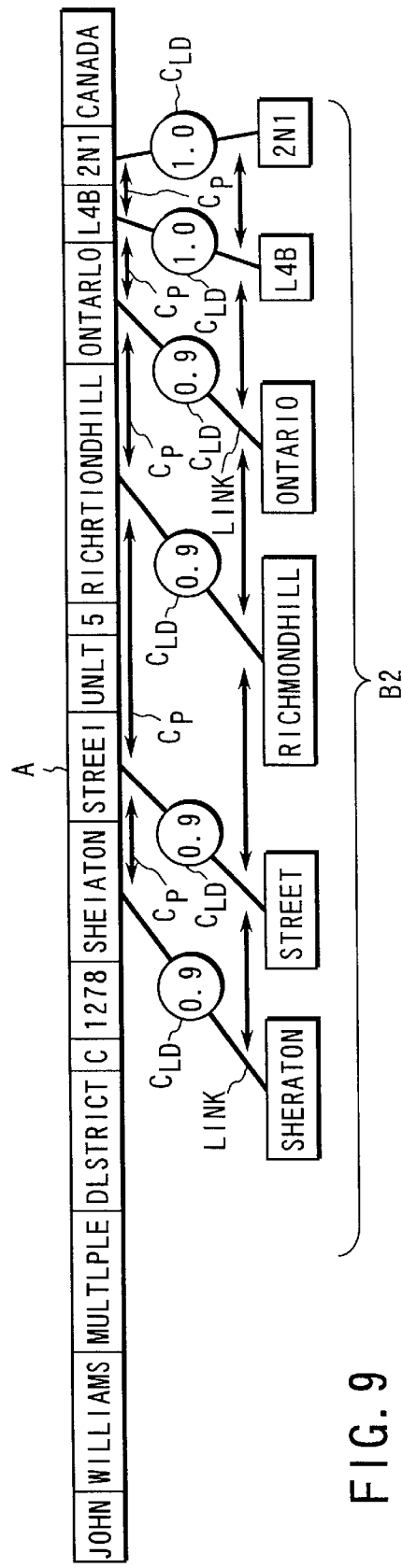

An example of the distance calculating section 5 is explained for the case of an n-th link between the word string A and the address data B1 as shown in FIG. 8 and the case of an m-th link between the word string A and the address data B2 as shown in FIG. 9.

In this case, as shown in FIG. 8, "WILLIAMS" of the word string A and "WILLIAMS" of the address data B1 are linked, "STREEI" of the word string A and "STREET" of the address data B1 are linked, "RICHRTIONDHILL" of the word string A and "RICHMONDHILL" of the address data B1 are linked, "ONTARLO" of the word string A and "ONTARIO" of the address data B1 are linked, "L4B" of the word string A and "L4B" of the address data B1 are linked, and "2N1" of the word string A and "2N1" of the address data B1 are linked.

Therefore, the distance between the words of "WILLIAMS" of the word string A and "WILLIAMS" of the address data B1 which are set in the first linked state is set at "1.0" . The distance between the words of "STREEI" of the word string A and "STREET" of the address data B1 which are set in the second linked state is set at "0.9". The distance between the words of "RICHRTIONDHILL" of the word string A and "RICHMONDHILL" of the address data B1 which are set in the third linked state is set at "0.9". The distance between the words of "ONTARLO" of the word string A and "ONTARIO" of the address data B1 which are set in the fourth linked state is set at "0.9". The distance between the words of "L4B" of the word string A and "L4B" of the address data B1 which are set in the fifth linked state is set at "1.0". The distance between the words of "2N1" of the word string A and "2N1" of the address data B1 which are set in the sixth linked state is set at "1.0".

As a result, the similarity ($C_{LD}$) between the word string A and the address data B1 in the n-th link is expressed as follows.

$$C_{LD} = 1/6 \sum (1.0 + 0.9 + 0.9 + 0.9 + 1.0 + 1.0)$$
$$= 0.95$$

Further, as shown in FIG. 9, "SHEIATON" of the word string A and "SHERATON" of the address data B2 are linked, "STREEI" of the word string A and "STREET" of the address data B2 are linked, "RICHRTIONDHILL" of the word string A and "RICHMONDHILL" of the address data B2 are linked, "ONTARLO" of the word string A and "ONTARIO" of the address data B2 are linked, "L4B" of the word string A and "L4B" of the address data B2 are linked, and "2N1" of the word string A and "2N1" of the address data B2 are linked.

Therefore, the distance between the words of "SHEIATON" of the word string A and "SHERATON" of the address data B2 which are set in the first linked state is set at "0.9". The distance between the words of "STREEI" of the word string A and "STREET" of the address data B2 which are set in the second linked state is set at "0.9". The distance between the words of "RICHRTIONDHILL" of the word string A and "RICHMONDHILL" of the address data B2 which are set in the third linked state is set at "0.9". The distance between the words of "ONTARLO" of the word string A and "ONTARIO" of the address data B2 which are set in the fourth linked state is set at "0.9". The distance between the words of "L4B" of the word string A and "L4B" of the address data B2 which are set in the fifth linked state is set at "1.0". The distance between the words of "2N1" of the word string A and "2N1" of the address data B2 which are set in the sixth linked state is set at "1.0".

As a result, the similarity ($C_{LD}$) between the word string A and the address data B2 in the m-th link is expressed as follows.

$$C_{LD} = 1/6 \sum (0.9 + 0.9 + 0.9 + 0.9 + 1.0 + 1.0)$$
$$= 0.93$$

The phase deriving section 6 makes the above calculation for each link and the thus derived values are averaged. That is, a value expressed by the following equation (7) is derived and the thus derived value is stored into the memory M5 as a phase difference E.

$$C_P = \frac{1}{6} \sum_i \{(D_{i,i-1}^M - D_{i,i-1}^I)^2 + (D_{i,i+1}^M - D_{i,i+1}^I)^2\} \quad (7)$$

That is, the number "5" of words lying between "WILLIAMS" in the first linked position of the word string A and "STREEI" in the second linked position is used as the phase difference. The number "2" of words lying between "STREEI" in the second linked position of the word string A and "RICHRTIONDHILL" in the third linked position is used as the phase difference. The number "0" of words lying between "RICHRTIONDHILL" in the third linked position of the word string A and "ONTARIO" in the fourth linked position is used as the phase difference. The number "0" of words lying between "ONTARLO" in the fourth linked position of the word string A and "L4B" in the fifth linked position is used as the phase difference. The number "0" of words lying between "L4B" in the fifth linked position of the word string A and "2N1" in the sixth linked position is used as the phase difference.

Thus, the phase difference $C_P$ is expressed as follows.

$C_P$=⅙Σ(6−1)2+(3−1)2+(3−1)2+(1−1)2+(1−1)2+(1−1)2+(1−1)2+(1−1)

As a result, the phase difference ($C_P$) between the word string A and the address data B1 in the n-th link is set to "9.66".

Further, the number "0" of words lying between "SHERATON" in the first linked position of the word string A and "STREEI" in the second linked position is used as the phase difference. The number "2" of words lying between "STREEI" in the second linked position of the word string A and "RICHRTIONDHILL" in the third linked position is used as the phase difference. The number "0" of words lying between "RICHRTIONDHILL" in the third linked position of the word string A and "ONTARIO" in the fourth linked position is used as the phase difference. The number "0" of words lying between "ONTARLO" in the fourth linked position of the word string A and "L4B" in the fifth linked position is used as the phase difference. The number "0" of words lying between "L4B" in the fifth linked position of the word string A and "2N1" in the sixth linked position is used as the phase difference.

Thus, the phase difference $C_P$ is expressed as follows.

$$C_P = 1/6 \sum (1-1)2 + (3-1)2 + (3-1)2 + (1-1)2 + (1-1)2 +$$
$$(1-1)2 + (1-1)2 + (1-1)2 + (1-1)2$$
$$= 1.26$$

As a result, the phase difference ($C_P$) between the word string A and the address data B2 in the m-th link is set to "1.26".

The evaluated value calculating section 7 derives an evaluated value $C_{ALL}$ according to the following evaluation function based on the distance $C_{LD}$ and the phase difference $C_P$ which are previously derived and stores the thus derived evaluated value $C_{ALL}$ into the memory M6. The derived evaluated value $C_{ALL}$ indicates that the better collation result is obtained as the value thereof is smaller.

$$C_{ALL} = C_P - C_{LD}$$

The link updating section 8 updates the link C based on the derived evaluated value $C_{ALL}$. That is, if it is detected that an evaluated value $C_{ALL}'$ derived in the present cycle is smaller than the previous evaluated value $C_{ALL}$ when the evaluated value $C_{ALL}$ is compared with the evaluated value $C_{ALL}'$, the evaluated value $C_{ALL}'$ is used instead of the previous evaluated value $C_{ALL}$ (hill-climbing method). Then, part of the links is updated and the process starting from the process of the distance calculating section 5 is performed again. The process is repeatedly effected until it is stopped by the optimum solution deriving section 9 which will be described later.

For example, in the case of the n-th link between the word string A and the address data B1, the similarity ($C_{LD}$)=0.95 and the phase difference ($C_P$)=9.66 and the evaluated value ($C_{ALL}$) is derived as follows.

$$C_{ALL} = 9.66 + 0.95$$
$$= 8.71$$

Further, in the case of the m-th link between the word string A and the address data B2, the similarity ($C_{LD}$)=0.93 and the phase difference ($C_P$)=1.26 and the evaluated value ($C_{ALL}$) is derived as follows.

$$C_{ALL} = 1.26 + 0.99$$
$$= 0.34$$

In this case, the evaluated value ($C_{ALL}$) becomes minimum and is used as the optimum solution.

The optimum solution deriving section 9 determines that transition of the evaluated value ($C_{ALL}$) is sufficiently converged and repeatedly performs the process starting from the process of the link initializing section 4 for the next address data B2. When the address data B1 B2, . . . to be compared is no more present, the repetition operation is terminated. Then, the smallest one of the evaluated values $C_{ALL}$ derived by comparison with a plurality of address data items B1 B2, . . . is selected and used as the optimum solution.

That is, the address collation process in the first embodiment is schematically shown in FIGS. 8 and 9. The similarity in the first address data B1 is larger when only the distance (similarity) is used, but the phase relation (phase difference) between "WILLIAMS" and "STREEI" in the character string A for the first address data B1 is bad and, in the evaluation standard in this embodiment, even if the characters do not completely coincide with each other as in "SHERATON" and "SHEIATON" at the stage of the character recognition result, the phase relation with the adjacent link is taken into consideration and the second address data (correct solution) B2 is selected as the optimum solution.

The output section 10 converts the optimum solution derived in the optimum solution deriving section 9 into a form which the user can understand and outputs the thus converted address data and is a display device, for example.

Figure 10:
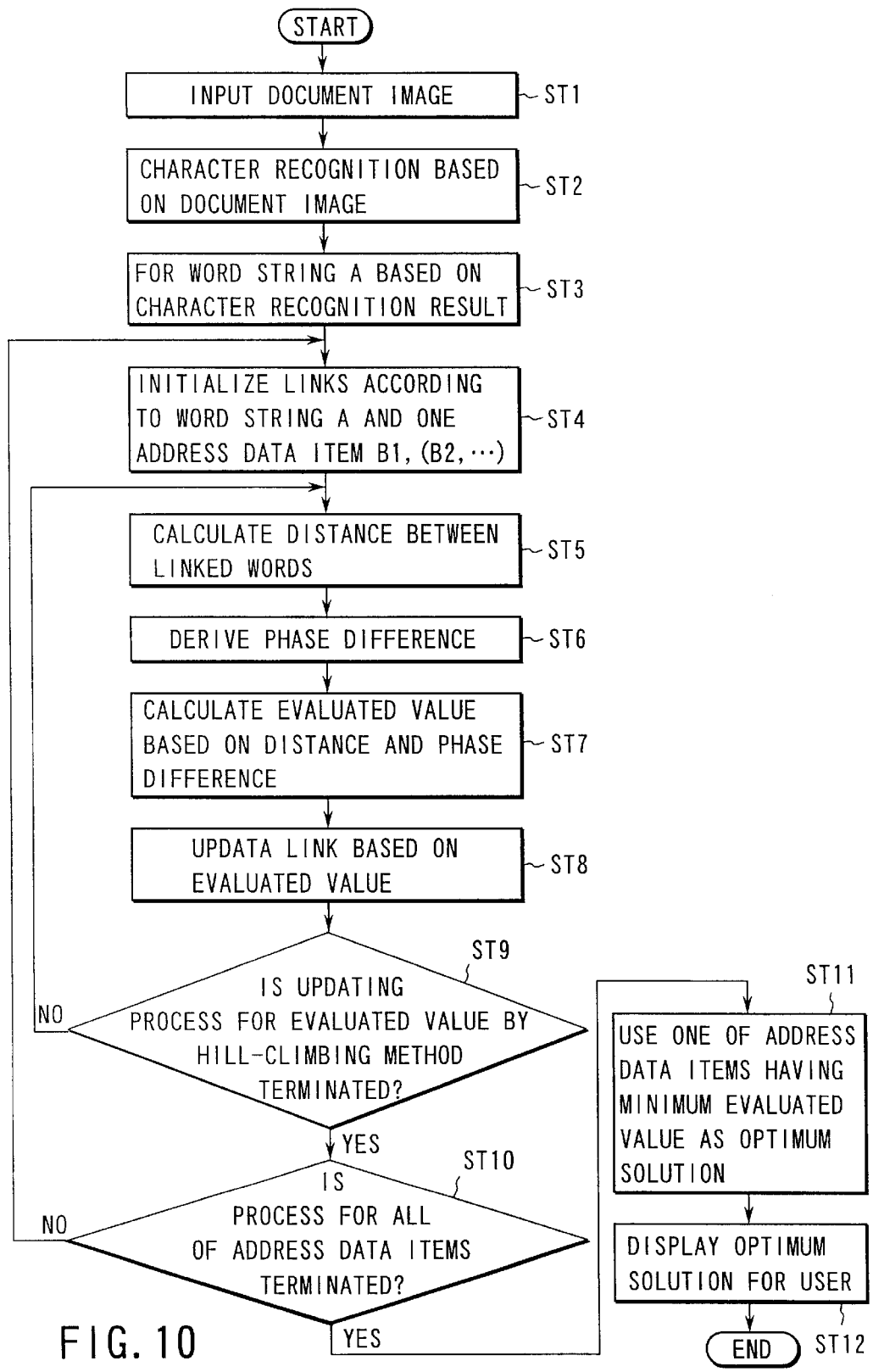
FIG. 10 is a flowchart for illustrating the address collating process in the first embodiment.

With the above construction, the operation is explained with reference to the flowchart shown in FIG. 10.

For example, a document image of an address or the like written on an envelop is input to the input section 1 (ST1) and supplied to the character recognizing section 2. Then, the character recognizing section 2 performs the character recognizing process based on the input document image (ST2) and supplies the character recognition result to the word string forming section 3.

As a result, the word string forming section 3 forms a word string A based on the character recognition result of the character recognizing section 2 (ST3) and stores the word string into the memory M1.

The link initializing section 4 initializes a link C according to the word string A stored in the memory M1 and one address data item B1, (B2, . . . ) read out from the address memory M2 (ST4) and stores the initialized link into the memory M3.

The distance calculating section 5 calculates a distance $C_{LD}$ between the linked words stored in the memory M3 based on the word string A stored in the memory M1 and one address data B1, (B2, . . . ) read out from the address dictionary M2 (ST5) and stores the calculated distance in the memory M4.

The phase deriving section 6 makes the above calculation for each link and averages the thus obtained results (ST6). That is, a value is derived based on the following equation (7) and the thus derived value is stored in the memory MS as the phase difference ($C_P$).

$$C_P = \frac{1}{6} \sum_i \{(D_{i,i-1}^M - D_{i,i-1}^I)^2 + (D_{i,i+1}^M - D_{i,i+1}^I)^2 \quad (7)$$

The evaluated value calculating section 7 derives an evaluated value $C_{ALL}$ according to the above-described evaluation function based on the distance $C_{LD}$ previously derived and stored in the memory M4 and the phase difference $C_P$ stored in the memory MS (ST7) and stores the derived evaluated value $C_{ALL}$ into the memory M6.

$$C_{ALL} = C_P - C_{LD}$$

The link updating section 8 updates the link C stored in the memory M3 based on the evaluated value $C_{ALL}$ thus derived and stored in the memory M6 (ST8).

Then, the link updating section 8 determines whether or not the updating process of the evaluated value $C_{ALL}$ by the hill-climbing method has been performed for all of the links (ST9), and if the updating process is not terminated, the operation returns to the calculation process for the distance $C_{LD}$ between the words in the step ST5.

If it is determined in the step ST9 that the updating process is terminated, whether the process for all of the to-be-processed address data items in the address dictionary M2 is terminated or not is determined (ST10). If it is determined in the step ST10 that the process is not terminated, the operation is returned to the link initialization process of the step ST4, and if the process is terminated, the optimum solution deriving section 9 selects the smallest one of the evaluated values $C_{ALL}$ from the memory M6 which are obtained as the result of comparison with the plurality of address data items B1 B2, ... in the memory M2 and outputs the selected evaluated value to the output section 10 as the optimum solution (ST11).

As a result, the output section 10 converts the optimum solution derived in the optimum solution deriving section 9 into a form which the user can understand and outputs the thus converted optimum solution (ST12).

As described before, the address collation process in the first embodiment is schematically shown in FIGS. 8 and 9. The similarity in the first address data B1 is larger when only the distance (similarity) is used, but the phase relation (phase difference) between "WILLIAMS" and "STREEI" in the character string A for the first address data B1 is bad, and in the evaluation standard in this embodiment, even if the characters do not completely coincide with each other as in "SHERATON" and "SHEIATON" at the stage of the character recognition result, the phase relation with the adjacent link is taken into consideration, that is, a word close to the street suffix as "STREET" is taken into consideration, and the second address data (correct solution) B2 is selected as the optimum solution.

The output section 10 converts the optimum solution derived in the optimum solution deriving section 9 into a form which the user can understand (from code data to display data) and outputs the thus converted data and is a display device, for example.

Thus, according to the first embodiment, the address collation process with the extremely high precision can be effected by using a "link" expressing the connection (correspondence relation) between the word string and the address data and connecting the characteristic portions which are locally similar to each other from the viewpoint of both of the phase (positional relation) and distance (similarity) between the words by use of the link at the address collation time.

Next, a second embodiment of this invention is explained.

In the first embodiment described above, the initial value of the link is determined by uniform distribution in the link initializing section 4, but in the second embodiment, a word having a minimum distance (maximum similarity) is temporarily derived for each address data item before initialization and the thus derived word is used as an initial value and the operation is shown in FIG. 11.

Thus, according to the second embodiment, at the link initialization stage, a quasi-optimum solution can be derived, and since the optimum solution deriving process is started based on the thus derived value, the optimum solution searching time can be shortened.

Next, a third embodiment of this invention is explained.

In the first embodiment, the links are all re-set in the link initializing section 4 each time the address data B1, ... is read out, but in the third embodiment, if an item (word) which is common with address data previously collated is present, the result is re-used as the initial value and the operation is shown in FIGS. 12 and 13.

In this case, the link between "SHEIATON" of the word string A and "RICHMONDHILL" of the address data B1, the link between "5" of the word string A and "ONTARIO" of the address data B1, the link between "ONTARLO" of the word string A and "L4B" of the address data B1, and the link between "CANADA" of the word string A and "2N1" of the address data B1 shown in FIG. 12 is re-used as initial values for the next address data B2 as shown in FIG. 13.

Thus, according to the third embodiment, calculations for commonly usable (re-usable) potions in the optimum solution previously obtained can be omitted and the optimum solution searching time can be shortened.

This invention is not limited to the above embodiments and can be variously modified without departing from the technical scope thereof. For example, the method for deriving the evaluated value, phase and distance between the words is not limited to the equations described above. Further, as the link updating method, various optimization methods which are well known in the art can be used other than the hill-climbing method as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A word string collating apparatus for collating an input word string and words in a word dictionary when a partial word string is extracted from the result of character recognition for a word string including a plurality of words, comprising:

correspondence setting means for variously setting correspondence relations between the words of the input word string and the words in the word dictionary according to the number of words of the extracted partial word string;

deriving means for deriving each distance between the words which are set into the correspondence relation by said correspondence setting means based on each similarity between the words and deriving the positional relation of each word of the input word string which is set into the correspondence relation by said correspondence setting means; and determining means for deriving an evaluated value based on the positional relation derived by said deriving means and the distance between the words which are set into the correspondence relation by said correspondence setting means for each type of the correspondence relation set by said correspondence setting means and determining a partial word string extracted from the input word string based on the evaluated value.

2. The word string collating apparatus according to claim 1, further comprising word string forming means for forming a word string based on the result of character recognition for the word string including a plurality of words.

3. The word string collating apparatus according to claim 1, which further comprises word string forming means for forming a word string based on the result of character recognition for the word string including a plurality of words and in which said deriving means includes distance calculating means for deriving a distance between the words which are set into the correspondence relation by said correspondence setting means based on the similarity between the words and positional relation deriving means for deriving a positional relation of each word of the formed word string which is set into the correspondence relation by said correspondence setting means.

4. The word string collating apparatus according to claim 1, which further comprises word string forming means for forming a word string based on the result of character recognition for the word string including a plurality of words and in which said deriving means includes distance calculating means for deriving a distance between the words which are set into the correspondence relation by said correspondence setting means based on the similarity between the words and positional relation deriving means for deriving a positional relation of each word of the formed word string which is set into the correspondence relation by said correspondence setting means, and said determining means includes evaluated value deriving means for deriving an evaluated value based on the positional relation derived by said deriving means and the distance between the words which are set into the correspondence relation by said correspondence setting means for each type of the correspondence relation set by said correspondence setting means and determining means for determining a partial word string extracted from the formed word string based on the evaluated value derived by said evaluated value deriving means.

5. The word string collating apparatus according to claim 1, wherein said correspondence setting means sets the correspondence relations by uniformly distributing the words of the input word string and the words in the word dictionary according to the number of words of the extracted partial word string in a first step and sets correspondence relations by partially changing the words which are uniformly distributed in each of succeeding steps.

6. The word string collating apparatus according to claim 1, wherein said correspondence setting means sets the correspondence relations by uniformly distributing the words of the input word string and the words in the word dictionary according to the number of words of the extracted partial word string in a first step, sets correspondence relations by partially changing the words which are uniformly distributed in each of succeeding steps, and uses the previously set correspondence relation for the word which is not changed when the correspondence relation is set by use of another word of the word dictionary.

7. The word string collating apparatus according to claim 1, wherein said correspondence setting means derives a word having a minimum distance among the words of the input word string for each word of the word dictionary and sets the correspondence relation between each word of the word dictionary and the derived word having the minimum distance.

8. A word string collating apparatus for collating an input word string and words in a word dictionary when a partial word string is extracted from the result of character recognition for a word string including a plurality of words, comprising:

word string forming means for forming a word string based on the result of character recognition for a word string including a plurality of words;

correspondence setting means for variously setting correspondence relations between the words of the word string formed by said word string forming means and the words in the word dictionary according to the number of words of the extracted partial word string;

distance calculating means for deriving each distance between the words which are set into the correspondence relation by said correspondence setting means based on each similarity between the words;

positional relation deriving means for deriving a positional relation of each word of the formed word string which is set into the correspondence relation by said correspondence setting means;

evaluated value deriving means for deriving an evaluated value based on the positional relation derived by said positional relation deriving means and the distance, derived by said distance calculating means, between the words which are set in the correspondence relation by said correspondence setting means for each type of the correspondence relation set by said correspondence setting means; and determining means for determining a partial word string extracted from the formed word string based on the evaluated value derived by said evaluated value deriving means.

9. The word string collating apparatus according to claim 8, wherein said correspondence setting means sets the correspondence relations by uniformly distributing the words of the input word string and the words in the word dictionary according to the number of words of the extracted partial word string in a first step and sets correspondence relations by partially changing the words which are uniformly distributed in succeeding steps.

10. The word string collating apparatus according to claim 8, wherein said correspondence setting means sets the correspondence relations by uniformly distributing the words of the input word string and the words in the word dictionary according to the number of words of the extracted partial word string in a first step, sets correspondence relations by partially changing the words which are uniformly distributed in succeeding steps, and uses the previously set correspondence relation for the word which is not changed when the correspondence relation is set by use of another word of the word dictionary.

11. The word string collating apparatus according to claim 9, wherein said correspondence setting means derives a word having a minimum distance among the words of the input word string for each word of the word dictionary and sets the correspondence relation between each word of the word dictionary and the derived word having the minimum distance.

12. A word string collating method for collating an input word string and words in a word dictionary when a partial word string is extracted from the result of character recognition for a word string including a plurality of words, comprising the steps of:

variously setting correspondence relations between the words of the input word string and the words in the word dictionary according to the number of words of the extracted partial word string;

deriving each distance between the words which are set into the correspondence relation in said correspondence setting step based on each similarity between the words and deriving the positional relation of each word of the input word string which is set into the correspondence relation in said correspondence setting step; and deriving an evaluated value based on the positional relation derived in said deriving step and the distance between the words which are set in the correspondence relation in said correspondence setting step for each type of the correspondence relation set in said correspondence setting step and determining a partial word string extracted from the input word string based on the evaluated value.

13. A word string collating apparatus for collating an input word string and words in a word dictionary when a partial word string is extracted from the result of character recognition for a word string including a plurality of words, comprising:

forming a word string based on the result of character recognition for a word string including a plurality of words;

variously setting correspondence relations between the words of the word string formed in said word string forming step and the words in the word dictionary according to the number of words of the extracted partial word string;

deriving each distance between the words which are set in the correspondence relation in said correspondence setting step based on each similarity between the words;

deriving a positional relation of each word of the formed word string which is set into the correspondence relation in said correspondence setting step;

deriving an evaluated value based on the positional relation derived in said positional relation deriving step and the distance, derived in said distance calculating step, between the words which are set in the correspondence relation in said correspondence setting step for each type of the correspondence relation set in said correspondence setting step; and determining a partial word string extracted from the formed word string based on the evaluated value derived in said evaluated value deriving step.

14. A word string collating apparatus for collating words of an input first word string including a plurality of words and words of each of third various word strings of a word dictionary when a second word string using part of the plurality of words is extracted from the result of character recognition for the first word string, comprising:

character recognizing means for recognizing the first word string containing the extracted second word string in the unit of character;

word extracting means for extracting characters recognized by said character recognizing means in the unit of word; and word string extracting means for collating the first word string including a plurality of words extracted by said word extracting means and the third various word strings of the word string dictionary, determining words of the second word string in the first word string respectively corresponding to the words of the third word string based on similarities between the words of the first word string and the words of the third word string, making evaluation for each of the third word strings based on the number of words between the words in the second word string thus determined and the similarities between the words of the third word string and the words of the second word string determined, and extracting one of the third word strings as the second word string.

* * * * *